United States Patent
Ivanov

(10) Patent No.: US 7,190,811 B2
(45) Date of Patent: Mar. 13, 2007

(54) ADAPTIVE TRACKING FOR GESTURE INTERFACES

(75) Inventor: Yuri Ivanov, Arlington, MA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/225,415

(22) Filed: Sep. 12, 2005

(65) Prior Publication Data

US 2006/0093186 A1 May 4, 2006

Related U.S. Application Data

(60) Provisional application No. 60/624,634, filed on Nov. 2, 2004.

(51) Int. Cl.
*G06K 9/00* (2006.01)
*H04N 7/18* (2006.01)

(52) U.S. Cl. ................ 382/103; 382/107; 348/155

(58) Field of Classification Search ........... 382/103, 382/104, 107; 348/143, 152–155, 169
See application file for complete search history.

(56) References Cited

U.S. PATENT DOCUMENTS

| | | | |
|---|---|---|---|
| 5,191,419 A | * | 3/1993 | Wischermann .......... 348/701 |
| 2003/0026455 A1 | | 2/2003 | Watanabe et al. |
| 2005/0168574 A1 | * | 8/2005 | Lipton et al. .......... 348/143 |

FOREIGN PATENT DOCUMENTS

GB 2080993 A * 2/1982

OTHER PUBLICATIONS

Wei et al. (Robust and Self-Adaptive Background Extraction in Video Object Change Detection, Proc. SPIE V. 5203, 2003, pp. 142-147.*
Heisele, B., et al, "Tracking Non-Rigid, Moving Objects Based on Color Cluster Flow," Proc. IEEE Conf. Computer Vision and Pattern Recognition, Jun. 1997, pp. 257-260.
Toyama, K., et al, "Wallflower: Principles and Practice of Background Maintenance," International Conference on Computer Vision, Sep. 1999, pp. 1-7, Corfu, Greece.
PCT International Search Report and Written Opinion, PCT/US05/39705, Sep. 25, 2006.

* cited by examiner

*Primary Examiner*—Jingge Wu
*Assistant Examiner*—Yubin Hung
(74) *Attorney, Agent, or Firm*—Mark Duell; Fenwick & West LLP

(57) ABSTRACT

A system and a method are disclosed for identifying pixels belonging to moving objects in a series of images by using a signed difference operation. A first signed difference is determined between a first image and a second image. A second signed difference is determined between a second image and a third image. Pixels that change from a positive sign in the first signed difference to a negative sign in the second signed difference belong to the moving object in the second image.

20 Claims, 4 Drawing Sheets

ADAPTIVE TRACKING FOR GESTURE INTERFACES

CROSS REFERENCE TO RELATED APPLICATIONS

This application claims priority under 35 USC § 119(e) to U.S. Provisional Patent Application No. 60/624,634, titled "Adaptive Tracking For Gesture Interfaces", filed on Nov. 2, 2004, which is incorporated by reference herein in its entirety.

BACKGROUND OF THE INVENTION

1. Field of the Invention

The present invention generally relates to the field of gesture interfaces, and more specifically, to algorithms for identifying and tracking moving objects in a visual field.

2. Description of the Related Art

Gesture interfaces are the means by which a user can convey commands to a computer system via bodily movements. This requires the computer to be able to identify a foreground object by its movement and differentiate it from the background. Thus, gesture recognition algorithms have been developed for these purposes.

Conventional gesture recognition algorithms suffer from various limitations. Many of the existing approaches to tracking include some form of background subtraction as an intermediate step to identifying moving regions. To accomplish this background subtraction, there is a need to model the background over an extended period of time. The necessity of maintaining the background model limits the use of such methods in mobile applications where camera motion is significant. A second limitation of some existing approaches to tracking are the errors that occur in identification of pixels belonging to a moving object, particularly when the moving object retraces its own trajectory. This limitation will be discussed below with reference to a particular algorithm, the Wallflower Algorithm, that was described in "Wallflower: Principles and practice of background maintenance," by Kentaro Toyama, John Krumm, Barry Brumitt, and Brian Meyers, in Seventh International Conference on Computer Vision, pp. 255–261, 1999, that is incorporated by reference herein in its entirety.

The Wallflower Algorithm consists of three parts—pixel-based, which models the backgrounds over extended periods of time, region-based, which finds regions of color belonging to moving objects and performs the object segmentation; and frame-based, which serves as a supervisor to the tracking system, deciding when the tracking conditions require re-initialization or a switch of context. The problem of misidentification of pixels as belonging to a moving object is attributed to the region-based part of the Wallflower Algorithm. FIG. 1 demonstrates how the Wallflower Algorithm identifies pixels as belonging to a moving object and how misidentifications occur. The first step is to find the differences between the two consecutive pairs of a triplet of video frames. For convenience, the times of the video frames are referred to as t−1, t, and t+1. Boxes 101 and 102 represent the field of view of a video camera and show the motion of a rectangular object over the three times. R1 represents the position of a moving object at time t−1, R2 represents the position of the moving object at time t, and R3 represents the position of the moving object at time t+1. Thus, box 101 is a composite image of the video frame from time t−1 overlaying the video frame from time t. Box 102 is a composite image of the video frame from time t+1 overlaying the video frame from time t. Mask 103 shows the differences between the frame from time t−1 and the video frame from time t. Mask 104 similarly shows the differences between the video frame from time t and the video frame from time t+1. In Masks 103 and 104, black areas indicate that the color of those pixels did not change between the two times, and white areas indicate that the color of those pixels did change. Box 105 shows the intersection of Masks 103 and 104. White areas 106 and 107 in box 105, according to the Wallflower Algorithm, indicate that the pixels belong to the moving object and not the background at time t. However, in this situation, when a triplet of consecutive frames contains a group of pixels that is alternately covered and uncovered, such as the pixels in the white area 107, the group is misidentified as belonging to the moving object when in fact it is part of the background. The Wallflower Algorithm misidentifies the pixels in area 107 as belonging to the moving object at time t when they should be identified as belonging to the background.

From the above, there is a need for a system and process to accurately differentiate between pixels belonging to moving objects and pixels belonging to an arbitrary background, even in situations where camera motion is significant.

SUMMARY OF THE INVENTION

The present invention includes a system and a method for gesture recognition to identify pixels belonging to moving objects in a series of images by using a short-term background model and a signed difference operation.

In one example, a uniform colored object moves in front of a black background. In one embodiment of the present invention, between a first image and a second, later image, the pixels that change from dark to light because the object moves to obscure the background in that region are assigned a positive sign, while the pixels that change from light to dark because the object's movement uncovers the background in that region will have a negative sign. In other words, a signed difference operation is used to compare the first image and the second image. Similarly, a signed difference operation is used to compare the second image and a third, later image. The pixels whose sign changes from positive to negative between the two signed difference images belong to the moving object in the second image and not the background.

In another example, an arbitrary colored background will affect the sign of the result of the frame differencing. The sign of the result must be normalized in comparison to a simple background model. First, a short-term background model is generated for a first time. The short-term background model contains the latest values of pixels that have been consistent, or unchanged, for at least two frames. A signed difference between two frames is determined. A sign correction mask is determined from the latest image and the short-term background model. A sign-normalized difference mask is determined. A short-term background model is generated for a second, later time. A signed difference for the second time is determined. A sign correction mask is determined from the image at the second time and the short-term background model for the second time. A sign-normalized difference mask is determined for the second time. Then, pixels that have a positive sign in the first sign-normalized difference mask and a negative sign in the second sign-normalized difference mask are identified as belonging to the moving object in the second image, and not the background, even when the object re-traces its own trajectory.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. ("FIG.") 1 illustrates a conventional method of identifying pixels belonging to a moving object.

Figure 1:
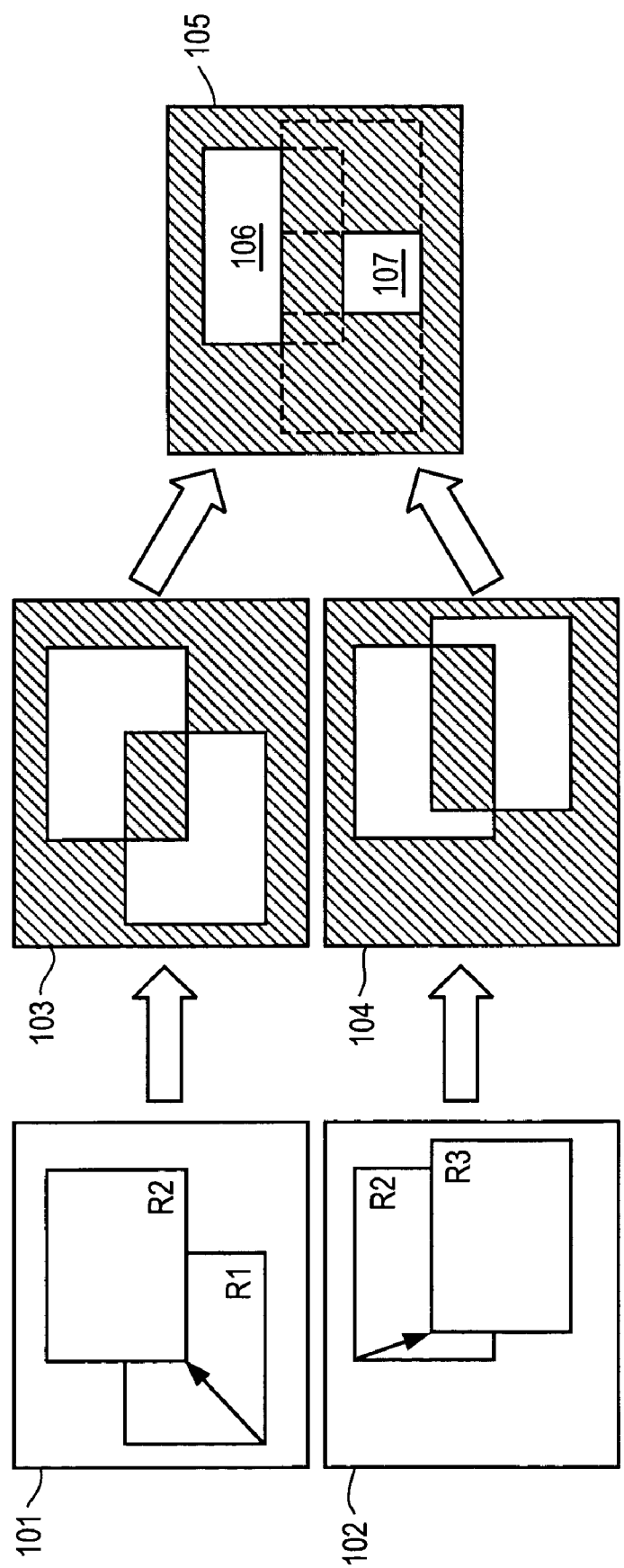
Figure 2:
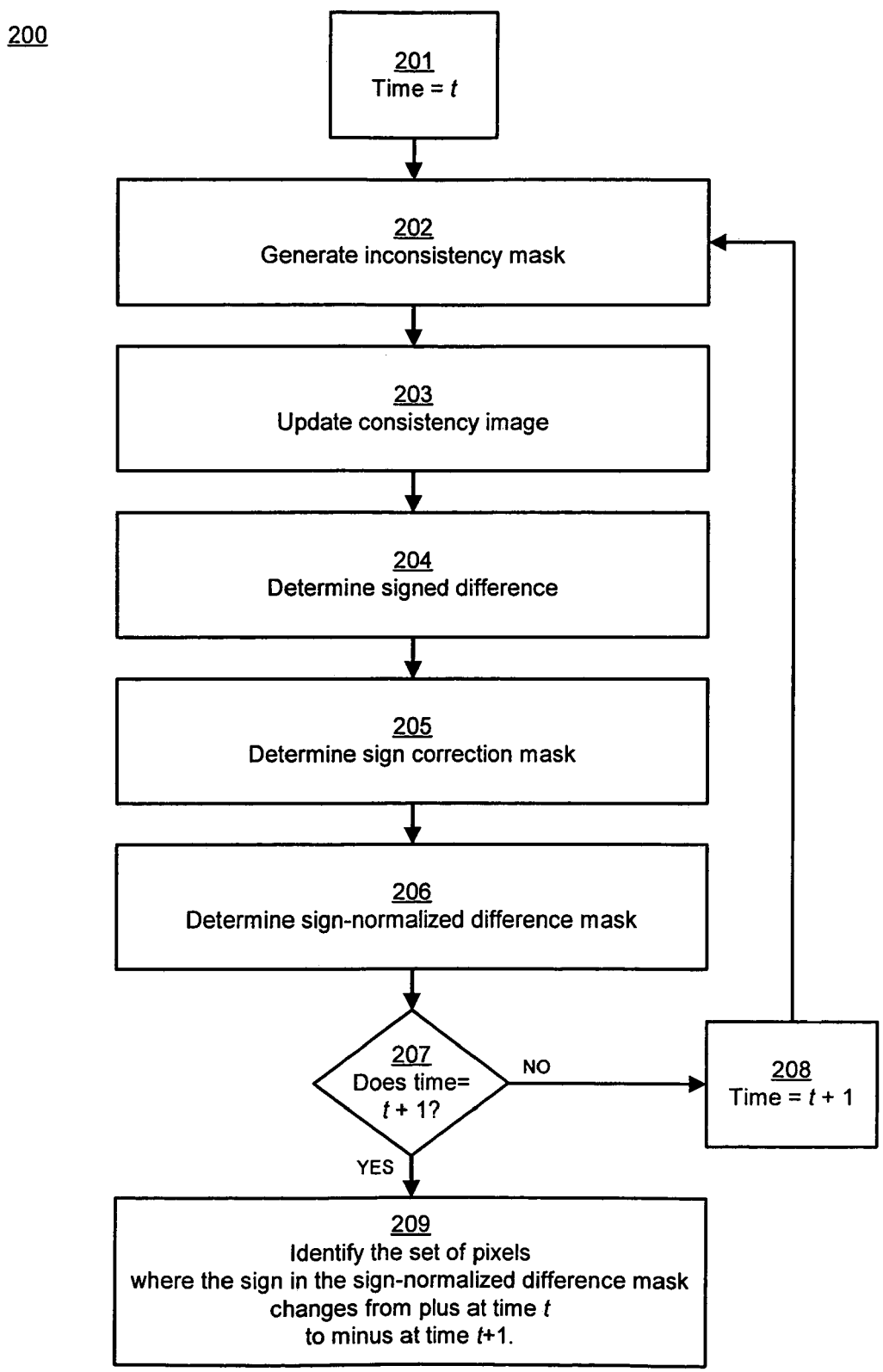
FIG. 2 is a flow diagram illustrating a method of identifying pixels belonging to a moving object according to one embodiment of the present invention.

It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

The Figures and the following description relate to particular embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures.

The present invention includes a method 200 of identifying pixels belonging to a moving object. At time t 201, the method begins by generating 202 an inconsistency mask for time t. In one embodiment, inconsistency mask I is found by selecting all pixels for which the absolute value of the change in the value of the pixels from a previous time (e.g., time t−1) to the time t is more than a small positive value $\epsilon$. The value of $\epsilon$ is chosen such that it is larger than the average amount of image noise. For instance, in the common 24-bit RGB image encoding, which provides 256 levels in each color channel, the value of $\epsilon$ is typically set to 10 or 15. The inconsistency mask I at time t can be found by the following equation:

$$I_t = |R_t - R_{t-1}| > \epsilon \qquad (1)$$

In this equation, R represents the value of each pixel. Thus, the value of each pixel at time t−1 is subtracted from the value of each pixel at time t on a pixel by pixel basis. The resulting mask contains values of 1 in all positions where values of $R_t$ and $R_{t-1}$ are different and 0 otherwise.

In step 203, the consistency image for time t is updated using the mask generated in step 202. The consistency mask functions as a short-term background model. The consistency mask is recursively built by retaining the latest values of pixels that have been "consistent" or unchanged for at least 2 frames. In one embodiment, the consistency image V at time t is found by the following equation:

$$V_t = I_t V_{t-1} + (1 - I_t) R_t \qquad (2)$$

The first term, "$I_t V_{t-1}$" represents the values of the pixels that must be retained from the previous consistency image V from the previous time t−1. These are the pixels that have been identified in equation 1 as having changed between time t−1 and time t. Thus, the most recent values of those pixels are not used in the consistency image because they have not been consistent. Instead, the values of those pixels from the previous consistency image should be used. The second term "$(1-I_t)R_t$" represents the values of the pixels for which new consistency values should be retained, thus updating the previous consistency image. The expression "$(1-I_t)$" represents the complement of the inconsistency mask I. Thus, it identifies the pixels that have remained consistent, or unchanged between time t−1 and time t. This expression is multiplied by $R_t$ because it is the value of each of these pixels from time t that should be added to build the consistency image V at time t.

In step 204, a signed frame difference for time t is determined. In one embodiment, the signed frame difference $S_t$ is found by the following equation:

$$S_t = R_t - R_{t-1} \qquad (3)$$

In this equation, the sign is of interest, but the exact value of the result can be ignored. The sign of the result will be formally extracted in equation 5, below.

In step 205, the sign correction mask for time t is determined. For the areas of the image where the pixel values have changed from dark to light the sign correction mask corrects the sign of this change to the normalized representation. This mask allows for a uniform treatment of light objects on dark backgrounds in the same way as dark objects on a light background. In one embodiment, the sign correction mask, $F_t$, is determined from the latest image and the consistency image according to the following equation:

$$F_t = 2H((R_t - V_t) - \beta) - 1 \qquad (4)$$

Note that the background pixels that are not obscured by the moving object are the same as the consistency image V. In one approach, these pixels are assigned a positive difference. To accomplish this, a step function, H, is applied to the difference between the current values and the consistency image values, and a threshold $\beta$ is used to account for differences due to noise. The step function H has a value of 0 for all negative values and 1 otherwise. Hence, $F_t$ is either −1 or 1. In other words, the sign is changed for all pixels for which the difference between the current image $R_t$ and the consistency image $V_t$ is smaller than some threshold $\beta$.

In step 206, the sign-normalized difference mask for time t is determined. In one embodiment, the sign-normalized difference mask for time t is determined from the following equation:

$$\overline{S}_t = \text{sign}(F_t S_t) \qquad (5)$$

This equation formally extracts the sign of the product of the sign correction mask and the signed frame difference. In one embodiment, $\overline{S}_t$ equals $-1$ or $1$. The result of this calculation is as it is pictured in FIG. 3. It is as if the white object moves in front of a black background.

The first time through steps 202 to 206, all the determinations are made for a first time t. At step 207, after the first time through the steps, time is not equal to time t+1. Thus, the next step is to advance to the next time, t+1, in step 208. Then, steps to 202 to 206 are completed for the second time, t+1. This results in the determination of $\overline{S}_{t+1}$ in step 206. After the steps 202 to 206 have been completed for time t+1, at step 207, time will be equal to t+1, so the next step is step 209. In step 209, the set of pixels for which the sign in the sign-normalized difference mask changes from plus to minus are identified. Preferably, these pixels are identified using reverse difference subtraction according to the following equation:

$$M_t = [(\overline{S}_t - \overline{S}_{t+1}) > 0] \quad (6)$$

Mask M contains pixels for which the sign in the sign-normalized difference mask changed from plus to minus. The negative values are set to 0 and positive values set to 1. This mask M contains the pixels that belong to the object in the frame at time t and not the background, even when the object re-tracks its own trajectory.

Figure 3:
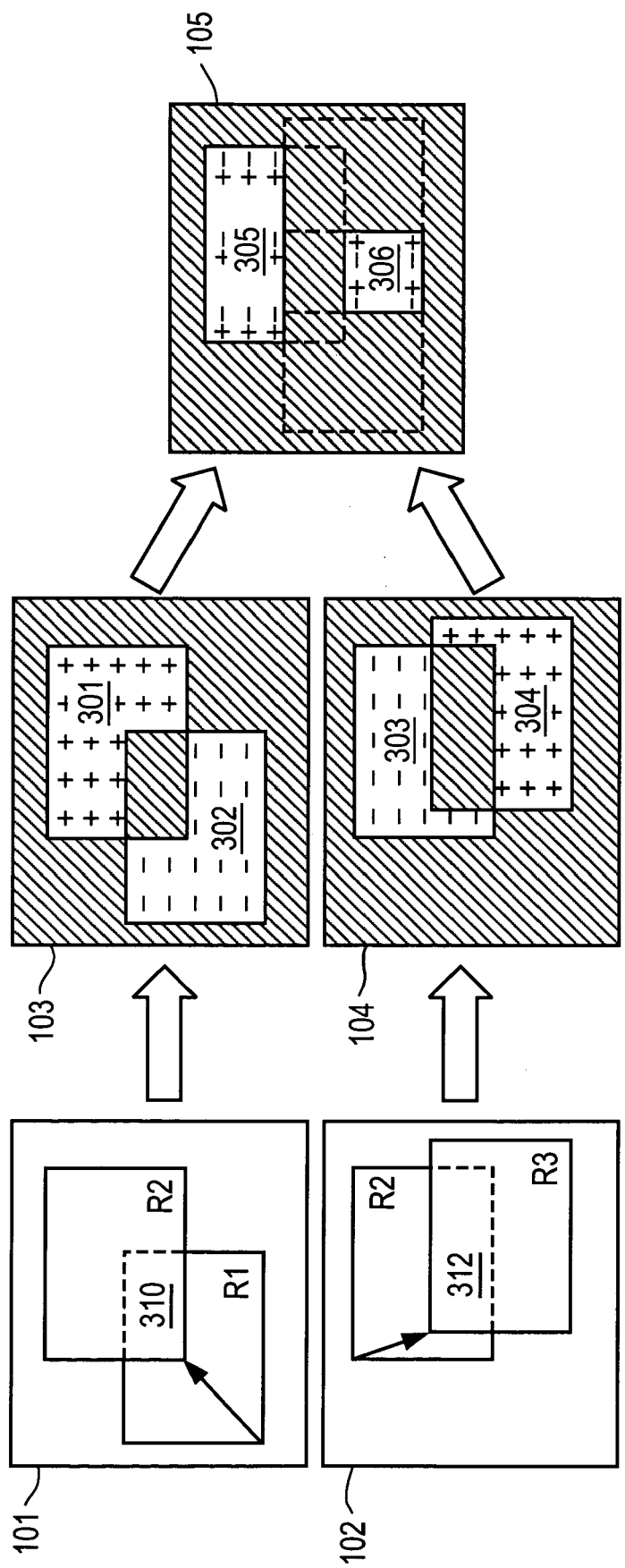
FIG. 3 illustrates the steps of the method of identifying pixels belonging to a moving object according to one embodiment of the present invention.

Referring now to FIG. 3, there is illustrated one embodiment of the method of the present invention. In this example, for ease of explanation, a uniform colored object moves in front of a black background. One of skill in the art will appreciate that the moving object may be any shape or color configuration and move in front of a complex background, without departing from the principles of the present invention.

As in FIG. 1, R1 in FIG. 3 represents the position of a moving object at time t−1, R2 represents the position of the moving object at time t, and R3 represents the position of the moving object at time t+1. Thus, box 101 is a composite image of the video frame from time t−1 overlaying the video frame from time t. Box 102 is a composite image of the video frame from time t+1 overlaying the video frame from time t. The following discussion describes how, as explained above for steps 202–206, the background (in this case a solid black background) is effectively removed from the image and the sign-normalized difference masks are determined.

As explained above with reference to step 202, an inconsistency mask is generated by selecting all pixels for which the absolute value of the change in the value of the pixels from a previous time is greater than a small positive value $\epsilon$. In the example depicted in FIG. 3, the inconsistency mask of box 101 would include all pixels within R1 and R2 except those in region 310. Region 310 are the pixels that retained the same value at time t as at time t−1 because they were part of the moving object at both times. Then, as explained above with reference to step 203, the consistency image is updated using the inconsistency mask. Thus, the short term background model is updated. As explained above with reference to step 204, then the signed difference is determined between the video frames at time t−1 and at time t. Later, the signed difference is determined between the video frames at time t and at time t+1. Because this example contains a solid color object moving in front of a black background, the sign correction mask which is determined in step 205 does not alter the signs of the signed difference in either case. Thus, the sign-normalized difference masks determined in step 206 has the same signs as the original signed difference in each case.

In FIG. 3, the sign-normalized difference masks are masks 103 and 104. Mask 103 shows the differences between the frame from time t−1 and the video frame from time t. Mask 104 similarly shows the differences between the video frame from time t and the video frame from time t+1. In Masks 103 and 104, black areas indicate that the color of those pixels did not change between the two times, and white areas indicate that the color of those pixels did change. In contrast to FIG. 1, the sign of the change is retained. White area 301 is assigned a plus sign because in this example, those pixels changed in value from darker (the value of the black background) to lighter (the value of the moving object) between times t−1 and time t. White area 302 is assigned a minus sign because those pixels changed in value from lighter to darker. It will be apparent that the assignment of the signs can be switched throughout this method without departing from the present invention.

In step 209, the set of pixels where the sign in the sign-normalized difference mask changes from plus at one time to minus at a later time are identified. In the example of FIG. 3, Box 105 shows the intersection of Masks 103 and 104, thus allowing the identification of the pixels that change sign. Note that by retaining the signs from the sign normalized difference masks 103 and 104, white area 305 is distinguishable from white area 306. In white area 305, the sign changes from plus to minus whereas in white area 306, the sign changes from minus to plus. Because the method of the present invention identifies the set of pixels where the sign in the sign-normalized difference mask changes from plus at time t to minus at time t+1 as being part of the moving object and excludes the set of pixels where the sign in the sign-normalized difference mask changes from minus to plus, the method of the present invention correctly identifies pixels belonging to the moving object. Whereas the Wallflower Algorithm misidentified the pixels in white area 107 in FIG. 1 as belonging to the moving object, the method of the present invention results in these pixels being correctly identified as belonging to the background.

The result of maintaining signed differences shows that the true and phantom pixels have different directions of the sign change. This can be used for differentiating between the true pixels that are part of the moving object and false positives, even when an object retraces its own trajectory as in this example.

Figure 4:
FIG. 4 illustrates a comparison of the results generated by the Wallflower Algorithm and by one embodiment of the method of the present invention.

The accurate identification of pixels belonging to the moving object is important to building appropriate object color models, as is known in the art. An accurate object color model assists in the tracking of the moving object. Referring now to FIG. 4, there is illustrated the technique of the present invention compared to the Wallflower Algorithm technique on a video sequence of a moving hand. The first row 401 shows selected images from the video sequence used to test the techniques. The second row 402 shows the pixels selected by the Wallflower Algorithm to build the color model. As shown by the non-black pixels in the second row 402, the pixels selected by the Wallflower Algorithm include parts of the background, as well as the person's shirt, and reflections in the glass behind the person. To the extent that non-black pixels appear in rows 402 and 403 that are not part of the moving object, the color model for the moving object has not been selective enough. The third row 403 shows the pixels selected by the method of the present invention from the same video sequence. As shown in row 403, the selectivity of the method of the present invention is higher. The present invention is thus shown to out-perform the Wallflower Algorithm in the acquisition of a selective color model for the moving object.

Upon reading this disclosure, those of skill in the art will appreciate still additional alternative structural and functional designs for a system and a process for identifying a set of pixels through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A computer based method for identifying representations of a first object in at least three images including a first, second and third image comprising a collection of pixels, wherein a position of the first object in the at least three images is different, the method comprising:
   (a) determining a first difference in values between the first image and the second image at a pixel location;
   (b) assigning a first sign associated with the first difference;
   (c) repeating steps (a)–(b) for each of a first set of pixel locations in the first image and the second image;
   (d) determining a second difference in values between the second image and the third image at the pixel location;
   (e) assigning a second sign associated with the second difference;
   (f) repeating steps (d)–(e) for each of the first set of pixel locations in the second image and the third image; and
   (g) identifying the pixel locations where the first sign and the second sign associated with each of the pixel locations have a first pattern.

2. The method of claim 1, wherein the first pattern comprises a negative first sign and a positive second sign.

3. The method of claim 1, wherein the first pattern comprises a positive first sign and a negative second sign.

4. The method of claim 1, wherein the first image is earlier in time than the second image, and the second image is earlier in time than the third image.

5. The method of claim 1, wherein the first set of pixel locations comprises all pixel locations in the first image.

6. The method of claim 1, wherein the first sign associated with the first difference is positive when the first difference in values is positive.

7. The method of claim 1, wherein the first sign associated with the first difference is negative when the first difference in values is positive.

8. A computer based method for identifying representations of a first object in at least three images including a first, second and third image comprising a collection of pixels, wherein a position of the first object in the at least three images is different, the method comprising:
   (a) determining a first difference in values between the first image and the second image at a pixel location;
   (b) assigning a first sign associated with the first difference;
   (c) determining a second difference in values between the second image and the third image at the pixel location;
   (d) assigning a second sign associated with the second difference;
   (e) repeating steps (a)–(d) for each of a first set of pixel locations in the at least three images; and
   (f) identifying the pixel locations where the first sign and the second sign associated with each of the pixel locations have a first pattern.

9. The method of claim 8, wherein the first pattern comprises a negative first sign and a positive second sign.

10. The method of claim 8, wherein the first pattern comprises a positive first sign and a negative second sign.

11. The method of claim 8, wherein the first image is earlier in time than the second image, and the second image is earlier in time than the third image.

12. The method of claim 8, wherein the first set of pixel locations comprises all pixel locations in the first image.

13. The method of claim 8, wherein the first sign associated with the first difference is positive when the first difference in values is positive.

14. The method of claim 8, wherein the first sign associated with the first difference is negative when the first difference in values is positive.

15. A computer based system for identifying representations of a first object in at least three images including a first, second and third image comprising a collection of pixels, wherein a position of the first object in the at least three images is different, the system comprising:
   a first determining means for determining a first difference in values between the first image and the second image at at least two pixel locations;
   a first assigning means for assigning a first sign associated with the first difference at each of said at least two pixel locations;
   a second determining means for determining a second difference in values between the second image and the third image at said at least two pixel locations;
   a second assigning means for assigning a second sign associated with the second difference at each of said at least two pixel locations; and
   an identifying means for identifying the pixel locations where the first sign and the second sign associated with each of the pixel locations have a first pattern.

16. The system of claim 15, wherein the first pattern comprises a negative first sign and a positive second sign.

17. The system of claim 15, wherein the first pattern comprises a positive first sign and a negative second sign.

18. The system of claim 15, wherein the first image is earlier in time than the second image, and the second image is earlier in time than the third image.

19. The system of claim 15, wherein the at least two pixel locations comprises all pixel locations in the first image.

20. The system of claim 15, wherein the first sign associated with the first difference is positive when the first difference in values is positive.

* * * * *